US009952405B2

(12) United States Patent
Kondo

(10) Patent No.: US 9,952,405 B2
(45) Date of Patent: Apr. 24, 2018

(54) IMAGING LENS AND IMAGING APPARATUS

(71) Applicant: FUJIFILM Corporation, Tokyo (JP)

(72) Inventor: Masato Kondo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/402,283

(22) Filed: Jan. 10, 2017

(65) Prior Publication Data

US 2017/0242219 A1 Aug. 24, 2017

(30) Foreign Application Priority Data

Feb. 18, 2016 (JP) .................. 2016-028609

(51) Int. Cl.
 *G02B 9/12* (2006.01)
 *G02B 15/14* (2006.01)
 *G02B 13/00* (2006.01)
 *G02B 7/10* (2006.01)
(52) U.S. Cl.
 CPC ............. *G02B 13/001* (2013.01); *G02B 7/10* (2013.01); *G02B 9/12* (2013.01)
(58) Field of Classification Search
 CPC .......... G02B 13/001; G02B 7/10; G02B 9/12; G02B 15/14; G02B 15/16; G02B 15/163
 USPC ........ 359/689, 716, 748, 753, 784, 791, 792
 See application file for complete search history.

(56) References Cited

U.S. PATENT DOCUMENTS

| | | | | | |
|---|---|---|---|---|---|
| 4,986,643 | A | * | 1/1991 | Moriyama | ........... G02B 15/163 359/693 |
| 5,331,465 | A | * | 7/1994 | Miyano | .................. G02B 13/00 359/693 |
| 5,751,485 | A | * | 5/1998 | Suzuki | ................. G02B 15/163 359/554 |

FOREIGN PATENT DOCUMENTS

| | | |
|---|---|---|
| JP | 2013-019994 A | 1/2013 |
| JP | 2013-218015 A | 10/2013 |

* cited by examiner

*Primary Examiner* — William Choi
(74) *Attorney, Agent, or Firm* — Studebaker & Brackett PC

(57) ABSTRACT

The imaging lens consists of, in order from the object side, a first lens group G1 having a positive power, a diaphragm, a second lens group G2 having a positive power, and a third lens group G3. Each of the lens groups includes three or more lenses. A positive lens is disposed on a most object side in the first lens group G1, and a meniscus lens, which is concave toward the object side, is disposed to be closest to the object side in the second lens group G2. During focusing from an infinite distance object to a close-range object, elements ranging from the first lens group G1 to the second lens group G2 integrally move toward the object side, and the third lens group G3 remains stationary. The imaging lens satisfies a conditional expression about a radius of curvature of an air lens of the first lens group G1.

20 Claims, 17 Drawing Sheets

EXAMPLE 1

EXAMPLE 1

EXAMPLE 2

EXAMPLE 3

EXAMPLE 4

EXAMPLE 6

EXAMPLE 7

EXAMPLE 8

EXAMPLE 8

IMAGING LENS AND IMAGING APPARATUS

CROSS-REFERENCE TO RELATED APPLICATIONS

The present application claims priority under 35 U.S.C. § 119 to Japanese Patent Application No. 2016-028609, filed on Feb. 18, 2016. Each of the above application(s) is hereby expressly incorporated by reference, in its entirety, into the present application.

BACKGROUND OF THE INVENTION

1. Field of the Invention

The present invention relates to an imaging lens, which is appropriate for a digital camera, a video camera, and/or the like, and an imaging apparatus which comprises the imaging lens.

2. Description of the Related Art

In the related art, as imaging lenses that can be used in cameras in the field mentioned above, for example, imaging lenses proposed in the following JP2013-019994A and JP2013-218015A. JP2013-019994A describes a lens system that includes in order from the object side: a first lens group that has a positive refractive power; a second lens group that has a negative refractive power; a third lens group; and a fourth lens group that has a positive refractive power, where a cemented lens is disposed right before an aperture diaphragm on the object side.

JP2013-218015A describes a front-focus-type imaging lens that performs focusing by moving a lens group on the object side. During focusing, in imaging lenses of Examples 4 and 5 of JP2013-218015A, a lens group on a most image side remains stationary, and a lens group closer to the object side than the lens group integrally moves as a movable group, thereby performing focusing. In imaging lenses of Examples 1 to 3 of JP2013-218015A, a movable group during focusing is the same as those of Examples 4 to 5. However, a floating system, in which the movable group is divided into two groups and these two groups are moved such that a relative interval therebetween is changed, may be employed.

SUMMARY OF THE INVENTION

Recently, it is preferable to further miniaturize an imaging lens, and particularly it is preferable to employ an imaging lens having a small total length of the lens with respect to the size of a image sensor. However, it can't be said that the lens system described in JP2013-019994A has a sufficiently small total length of the lens. Lens systems of Examples 1 to 5 of JP2013-218015A does not sufficiently cope with recent demands for a decrease in size and an increase in ratio of the total length of the lens to the image sensor size in a state where the infinite distance object is in focus. Further, the lens systems of Examples 1 to 3 of JP2013-218015A employ floating systems. Thus, a mechanism for moving the lens groups becomes complicated, and this leads to an increase in size of a lens barrel or an increase in manufacture costs.

The present invention has been made in consideration of the above-mentioned situation, and thus its object is to provide a front-focus-type imaging lens, which has a small size and has a favorable optical performance so as to be capable of simplifying an apparatus configuration, and an imaging apparatus including this imaging lens.

An imaging lens of the present invention consists of, in order from an object side: a first lens group that has a positive refractive power; a diaphragm; a second lens group that has a positive refractive power; and a third lens group. The first lens group includes three or more lenses, and a positive lens is disposed to be closest to the object side in the first lens group. The second lens group includes three or more lenses, and a meniscus lens, which is concave toward the object side, is disposed to be closest to the object side in the second lens group. The third lens group includes three or more lenses. During focusing from an infinite distance object to a close-range object, the first lens group, the diaphragm, and the second lens group integrally moves to the object side, and the third lens group remains stationary with respect to an image plane. The imaging lens satisfies the following conditional expression (1).

$$1.01 < R1Yr/R1Zf \qquad (1)$$

Here, $R1Yr$ is a radius of curvature of an image side surface of a second lens from an image side in the first lens group, and $R1Zf$ is a radius of curvature of an object side surface of the lens closest to the image side in the first lens group.

In the imaging lens of the present invention, it is preferable that the lens closest to the image side in the first lens group is a negative lens which is concave toward the image side.

In the imaging lens of the present invention, it is preferable that the second lens from the image side in the first lens group is a positive lens which is concave toward the image side.

In the imaging lens of the present invention, it is preferable that a second lens from the object side in the second lens group is a meniscus lens which is concave toward the object side.

In the imaging lens of the present invention, the third lens group may consist of three lenses.

In the imaging lens of the present invention, the first lens group may consist of, in order from the object side, two positive lenses and one negative lens.

It is preferable that the imaging lens of the present invention satisfies at least one of the following conditional expressions (2) to (7) and (1-1) to (7-1).

$$|f/f3| < 0.45 \qquad (2)$$

$$20 < v1Y - v1Z \qquad (3)$$

$$0.4 < f/f2 < 1.5 \qquad (4)$$

$$0.2 < f/f1 < 1 \qquad (5)$$

$$-0.5 < R21f/f2 < -0.1 \qquad (6)$$

$$0.2 < Bf/f < 0.6 \qquad (7)$$

$$1.05 < R1Yr/R1Zf < 1.7 \qquad (1-1)$$

$$|f/f3| < 0.35 \qquad (2-1)$$

$$28 < v1Y - v1Z < 42 \qquad (3-1)$$

$$0.5 < f/f2 < 1.2 \qquad (4-1)$$

$$0.3 < f/f1 < 0.7 \qquad (5-1)$$

$$-0.4 < R21f/f2 < -0.15 \qquad (6-1)$$

$$0.3 < Bf/f < 0.6 \qquad (7-1)$$

Here, f is a focal length of the whole system in a state where the infinite distance object is in focus, f3 is a focal length of the third lens group, ν1Y is an Abbe number of a second lens from the image side in the first lens group on the basis of a d-line, ν1Z is an Abbe number of a lens closest to the image side in the first lens group on the basis of the d-line, f2 is a focal length of the second lens group, f1 is a focal length of the first lens group, R21f is a radius of curvature of an object side surface of a lens closest to the object side in the second lens group, Bf is an air conversion length from an image side surface of a lens, which is closest to the image side, to the image plane, R1Yr is a radius of curvature of an image side surface of the second lens from the image side in the first lens group, and R1Zf is a radius of curvature of an object side surface of the lens closest to the image side in the first lens group.

An imaging apparatus of the present invention comprises the imaging lens of the present invention.

It should be noted that a term "includes, substantially ~" means that the imaging lens may include not only the above-mentioned elements but also lenses substantially having no powers, optical elements, which are not lenses, such as a diaphragm, and/or a cover glass, and mechanism parts such as a lens flange, a lens barrel, and/or a hand shaking correction mechanism.

In addition, the term "~ lens group that has a positive refractive power" means that the lens group has a positive refractive power as a whole. Reference signs of refractive powers of the lens groups, reference signs of refractive powers of the lenses, surface shapes of the lenses, and radii of curvature of surfaces of the lenses are assumed as those in paraxial regions in a case where some lenses have aspheric surfaces. Reference signs of radii of curvature of surface shapes convex toward the object side are set to be positive, and reference signs of radii of curvature of surface shapes convex toward the image side are set to be negative. Further, unless otherwise noted, the above conditional expressions are based on the d-line (a wavelength of 587.6 nm, where nm represents nanometer).

According to the present invention, the lens system consists of, in order from the object side, the first lens group having a positive power, the diaphragm, the second lens group having a positive power, and the third lens group. In the lens system, during focusing from an infinite distance object to a close-range object, elements ranging from the first lens group to the second lens group integrally move to the object side, and the third lens group remains stationary. Thereby, configurations of the respective lens groups are appropriately set such that the lens groups further satisfy predetermined conditional expressions. Thus, it is possible to provide a front-focus-type imaging lens, which has a small size and has a favorable optical performance so as to be capable of simplifying an apparatus configuration, and an imaging apparatus comprising this imaging lens.

DESCRIPTION OF THE PREFERRED EMBODIMENTS

Figure 1:
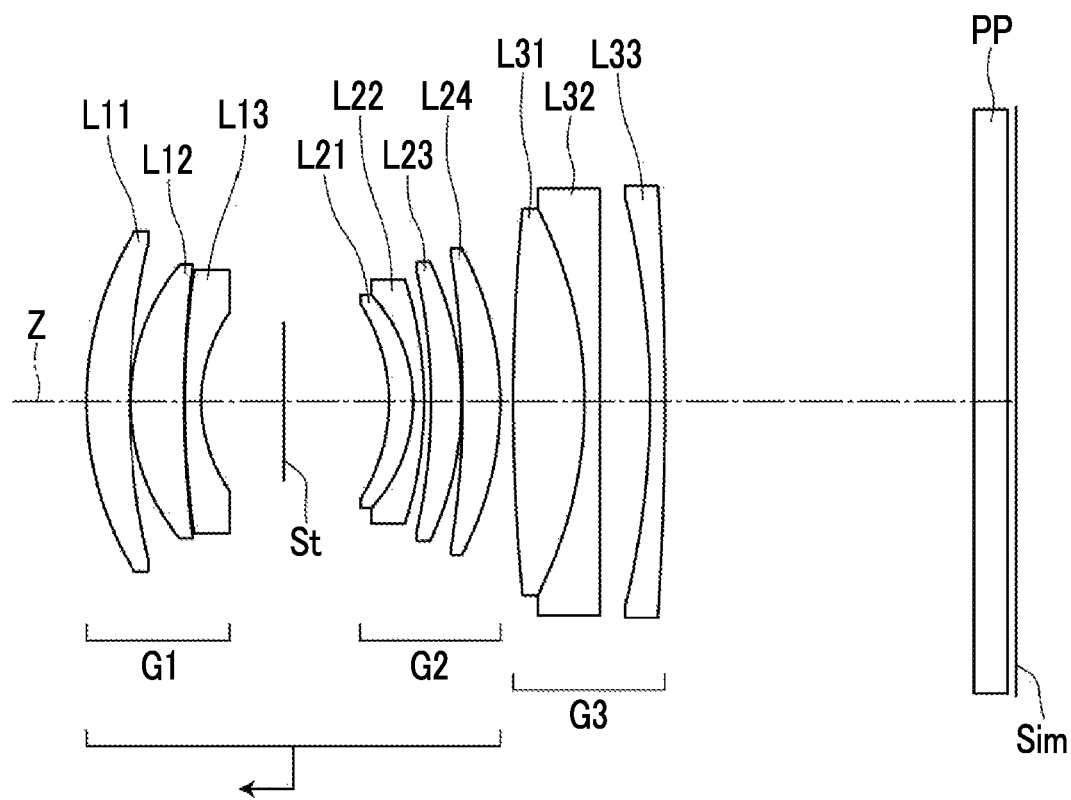
FIG. 1 is a cross-sectional view illustrating a configuration of an imaging lens of Example 1 of the present invention.

Hereinafter, embodiments of the present invention will be described with reference to drawings. FIG. 1 is a cross-sectional view illustrating a configuration of an imaging lens of according to an embodiment of the present invention, and corresponds to Example 1 to be described later. FIG. 1 shows a situation where the infinite distance object is in focus, the left side thereof is an object side, and the right side thereof is an image side.

This imaging lens includes, substantially in order from the object side to the image side along an optical axis Z: a first lens group G1 that has a positive refractive power as a whole; an aperture diaphragm St; a second lens group G2 that has a positive refractive power as a whole; and a third lens group G3 that has a positive or a negative refractive power as a whole. It should be noted that the aperture diaphragm St shown in FIG. 1 does not necessarily indicate its sizes and/or shapes, but indicates a position of the diaphragm on the optical axis Z.

In the example shown in FIG. 1, the first lens group G1 includes three lenses, that is, lenses L11 to L13 in order from the object side, the second lens group G2 includes four lenses, that is, lenses L21 to L24 in order from the object side, and the third lens group G3 includes three lenses, that is, lenses L31 to L33 in order from the object side. However, each lens group may include lenses of which the number is different from that in the example shown in FIG. 1.

In order to apply the imaging lens to an imaging apparatus, it is preferable to provide various filters and/or a protective cover glass based on specification of the imaging apparatus. Thus, FIG. 1 shows an example where a plane-parallel-plate-like optical member PP, in which those are considered, is disposed between the lens system and the image plane Sim. However, a position of the optical member PP is not limited to that shown in FIG. 1, and it is also possible to adopt a configuration in which the optical member PP is omitted.

The imaging lens is a front-focus-type lens system. The front-focus-type lens system is advantageous in decreasing a length of an optical system in the optical axis direction, and has a relatively simple configuration in terms of mechanism. For example, the lens system can be applied as a lens system for an interchangeable-lens-type digital camera. During focusing from the infinite distance object to the close-range object, in the imaging lens, the first lens group G1, the aperture diaphragm St, and the second lens group G2 integrally move from the image side to the object side, and the third lens group G3 remains stationary with respect to the image plane Sim. With such a configuration, it is possible to decrease a lens diameter, and it is possible to appropriately shorten a total length of the lens. Further, compared with the lens system using a floating system, it is possible to simplify a mechanism for moving lens groups during focusing or the like. Thus, it is possible to simplify the apparatus.

The first lens group G1 substantially includes three or more lenses, a positive lens is disposed on the most object side in the first lens group G1. By forming the most object side lens as a positive lens, there is an advantage in reduction of the total length of the lens.

The imaging lens is configured such that the lenses of the first lens group G1 satisfy the following conditional expression (1).

$$1.01 < R1Yr/R1Zf \tag{1}$$

Here, R1Yr is a radius of curvature of an image side surface of a second lens from the image side in the first lens group, and R1Zf is a radius of curvature of an object side surface of a lens closest to the image side in the first lens group.

The conditional expression (1) is an expression about an air lens that is formed between the lens closest to the image side in the first lens group G1 and the second lens from the image side in the first lens group G1. By not allowing the result of the conditional expression (1) to be equal to or less than the lower limit, an air lens of a meniscus shape, which has an absolute value of the radius of curvature of the image side surface smaller than an absolute value of the radius of curvature of the object side surface, is disposed between the first lens and the second lens from the image side in the first lens group G1. Thus, it is possible to appropriately correct curvature of field.

It is preferable that the imaging lens satisfies the following conditional expression (1-1).

$$1.05 < R1Yr/R1Zf < 1.7 \tag{1-1}$$

By not allowing the result of the conditional expression (1-1) to be equal to or less than the lower limit, it is possible to increase an effect of the conditional expression (1). By not allowing the result of the conditional expression (1-1) to be equal to or greater than the upper limit, it becomes easy to correct curvature of field and additionally correct the other various aberrations, particularly, spherical aberration, simultaneously.

It is preferable that the lens closest to the image side in the first lens group G1 is a negative lens which is concave toward the image side. In this case, it is possible to appropriately correct occurrence of spherical aberration, and simultaneously it is possible to appropriately correct curvature of field and astigmatism.

It is preferable that the second lens from the image side in the first lens group G1 is a positive lens which is concave toward the image side. In this case, there is an advantage in appropriately correcting astigmatism, curvature of field, and chromatic aberration.

The first lens group G1 may include substantially, in order from the object side, two positive lenses and one negative lens. By using two positive lenses in the first lens group G1, a refractive power of each positive lens does not become extremely strong, and there is an advantage in correcting spherical aberration. In addition, by using one negative lens, it is possible to correct chromatic aberration.

For example, the first lens group G1 includes, in order from the object side, two positive meniscus lenses that are concave toward the image side, and a negative meniscus lens that is concave toward the image side. Each lens of the first lens group G1 can be formed as a single lens which is not bonded.

The aperture diaphragm St is disposed between the first lens group G1 and the second lens group G2. In such a manner, compared with a case where the aperture diaphragm St is disposed to be closer to the image side than the second lens group G2, the optical system becomes more symmetric with respect to the aperture diaphragm St, and it is possible to appropriately correct various aberrations.

The second lens group G2 includes substantially, three or more lenses, and a meniscus lens, which is concave toward the object side, is disposed on the most object side of the second lens group G2. By forming the most object side lens of the second lens group G2 in such a shape, it is possible to appropriately correct occurrence of spherical aberration, and it is possible to appropriately correct curvature of field and astigmatism.

It is preferable that the second lens from the object side in the second lens group G2 is a meniscus lens which is concave toward the object side. In this case, it is possible to suppress occurrence of astigmatism, and it is possible to ensure an angle of view.

The second lens group G2 may include substantially three or four lenses. In this case, there are advantageous in both of realization of favorable performance and reduction in total length of the lens.

For example, the second lens group G2 may include, in order from the object side: a cemented lens that is formed by bonding a positive meniscus lens, which is concave toward the object side, and a negative meniscus lens which is concave toward the object side; and two positive meniscus lenses which are concave toward the object side. Alternatively, the second lens group G2 may include, in order from the object side: a negative meniscus lens which is concave toward the object side; and two positive meniscus lenses which are concave toward the object side.

The third lens group G3 includes substantially three or more lenses. In such a manner, during focusing from an infinite distance object to a close-range object, it is possible to suppress fluctuation in various aberrations. The third lens group G3 may include substantially three lenses. In such a case, there is an advantage in reduction in total length of the lens.

For example, the most object side lens of the third lens group G3 may be formed as a positive lens that is convex toward the image side. Thus, the second lens from the object side in the third lens group G3 may be formed as a negative lens that is concave toward the object side.

It is preferable that the imaging lens satisfies at least one or an arbitrary combination of the following conditional expressions (2) to (7).

$$|f/f3|<0.45 \tag{2}$$

$$20<v1Y-v1Z \tag{3}$$

$$0.4<f/f2<1.5 \tag{4}$$

$$0.2<f/f1<1 \tag{5}$$

$$-0.5<R21f/f2<-0.1 \tag{6}$$

$$0.2<Bf/f<0.6 \tag{7}$$

Here, f is a focal length of the whole system in a state where the infinite distance object is in focus,
f3 is a focal length of the third lens group,
v1Y is an Abbe number of a second lens from the image side in the first lens group on the basis of a d-line,
v1Z is an Abbe number of a lens closest to the image side in the first lens group on the basis of the d-line,
f2 is a focal length of the second lens group,
f1 is a focal length of the first lens group,
R21f is a radius of curvature of an object side surface of a lens closest to the object side in the second lens group, and
Bf is an air conversion length from an image side surface of a lens, which is closest to the image side, to the image plane.

By making the imaging lens satisfy the conditional expression (2), it is possible to suppress a Petzval sum, and it is possible to prevent curvature of field from increasing. Further, by making the imaging lens satisfy the conditional expression (2), it is possible to suppress fluctuation in various aberrations during focusing from an infinite distance object to a close-range object. In order to more increase the effect of the conditional expression (2), it is more preferable that the following conditional expression (2-1) is satisfied.

$$|f/f3|<0.35 \tag{2-1}$$

By making the imaging lens satisfy the conditional expression (3), it is possible to appropriately correct chromatic aberration. Further, it is more preferable that the following conditional expression (3-1) is satisfied.

$$28<v1Y-v1Z<42 \tag{3-1}$$

By not allowing the result of the conditional expression (3-1) to be equal to or less than the lower limit, it is possible to increase an effect of the conditional expression (3). By not allowing the result of the conditional expression (3-1) to be equal to or greater than the upper limit, it is possible to prevent chromatic aberration from being excessively corrected.

By not allowing the result of the conditional expression (4) to be equal to or less than the lower limit, it is possible to ensure a positive refractive power of the second lens group G2, and it is possible to minimize the total length of the lens. By not allowing the result of the conditional expression (4) to be equal to or greater than the upper limit, it is possible to prevent the positive refractive power of the second lens group G2 from becoming extremely strong, and it becomes easy to minimize spherical aberration and/or astigmatism. In order to more increase the effect of the conditional expression (4), it is more preferable that the following conditional expression (4-1) is satisfied.

$$0.5<f/f2<1.2 \tag{4-1}$$

By not allowing the result of the conditional expression (5) to be equal to or less than the lower limit, it is possible to ensure a positive refractive power of the first lens group G1, and it is possible to minimize the total length of the lens. By not allowing the result of the conditional expression (5) to be equal to or greater than the upper limit, it is possible to prevent the positive refractive power of the first lens group G1 from becoming extremely strong, and it becomes easy to minimize spherical aberration and/or astigmatism. In order to more increase the effect of the conditional expression (5), it is more preferable that the following conditional expression (5-1) is satisfied.

$$0.3<f/f1<0.7 \tag{5-1}$$

By not allowing the result of the conditional expression (6) to be equal to or less than the lower limit, it is possible to prevent spherical aberration from being excessively corrected. By not allowing the result of the conditional expression (6) to be equal to or greater than the upper limit, it is possible to prevent spherical aberration from being insufficiently corrected. In order to more increase the effect of the conditional expression (6), it is more preferable that the following conditional expression (6-1) is satisfied.

$$-0.4<R21f/f2<-0.15 \tag{6-1}$$

Bf of the conditional expression (7) is an air conversion length from an image side surface of a lens, which is closest to the image side, to the image plane. By not allowing the result of the conditional expression (7) to be equal to or less than the lower limit, it becomes easy to obtain a back focal length necessary for an interchangeable lens of a camera. By not allowing the result of the conditional expression (7) to be equal to or greater than the upper limit, it is possible to suppress an increase in the total length of the lens. In order to more increase the effect relating to the lower limit of the conditional expression (7) while obtaining the effect relating to the upper limit of the conditional expression (7), it is more preferable that the following conditional expression (7-1) is satisfied.

$$0.3<Bf/f<0.6 \tag{7-1}$$

The above-mentioned preferred configurations and/or available configurations including the configurations relating to the conditional expressions may be arbitrary combinations, and it is preferable to selectively adopt the configurations in accordance with required specification. By appropriately adopting the configurations, it is possible to realize a front-focus-type imaging lens which has a small size and has a favorable optical performance without using a floating system. It should be noted that the "small size" described herein means that TL/IH is less than 3.5, where TL is the total length of the lens (a sum of a distance on the optical axis from a lens surface, which is closest to the object side, to a lens surface, which is closest to the image side, and the back focal length at the air conversion distance) and IH is a maximum image height.

Next, numerical examples of the imaging lens of the present invention will be described.

EXAMPLE 1

The cross-sectional view of the imaging lens of Example 1 is shown in FIG. 1, the configuration and the method thereof shown in the drawing is as described above. Thus, repeated description is partially omitted herein. As a group configuration, the imaging lens of Example 1 includes, in order from the object side, three groups, that is, a first lens group G1 that has a positive refractive power, an aperture diaphragm St, a second lens group G2 that has a positive refractive power, and a third lens group G3 that has a positive refractive power group. During focusing from an infinite distance object to a close-range object, the first lens group G1, the aperture diaphragm St, and the second lens group G2 integrally move toward the object side, and the third lens group G3 remains stationary with respect to the image plane Sim. The first lens group G1 includes three lenses, that is, lenses L11 to L13 in order from the object side, the second lens group G2 includes four lenses, that is, lenses L21 to L24 in order from the object side, and the third lens group G3 includes three lenses that is, lenses L31 to L33 in order from the object side. The action during focusing described herein is the same as those of the imaging lenses of Examples 2 to 8 to be described later.

Table 1 shows basic lens data of the imaging lens of Example 1, and Table 2 shows specification. In Table 1, the column of Si shows a surface number i (i=1, 2, 3, . . . ) attached to an i-th surface of the elements, where a surface on the object side of an element closest to the object side is regarded as a first surface and i sequentially increases toward the image side. The column of Ri shows a radius of curvature of the i-th surface. The column of Di shows a distance on the optical axis Z between the i-th surface and the (i+1)-th surface. In Table 1, the column of Ndj shows a refractive index of a j-th (j=1, 2, 3, . . . ) element at the d-line (a wavelength of 587.6 nm, where nm represents nanometer), where the element closest to the object side is regarded as the first element and j sequentially increases toward the image side. The column of vdj shows an Abbe number of the j-th element on the basis of the d-line.

Here, reference signs of radii of curvature of surface shapes convex toward the object side are set to be positive, and reference signs of radii of curvature of surface shapes convex toward the image side are set to be negative. Table 1 additionally shows the aperture diaphragm St and the optical member PP. In Table 1, in a place of a surface number of a surface corresponding to the aperture diaphragm St, the surface number and a term of (St) are noted. A value at the bottom place of Di indicates a distance between the image plane Sim and the surface closest to the image side in the table. The values of table 1 are obtained in a state where an infinite distance object is in focus.

Table 2 shows the focal length f of the whole system, the air conversion length Bf from an image side surface of a lens, which is closest to the image side, to the image plane, the F number FNo., and the maximum total angle of view 2ω, on the basis of d-line. [°] in the place of 2ω indicates that the unit thereof is a degree.

In data of each table, a degree is used as a unit of an angle, and millimeter (mm) is used as a unit of a length, but appropriate different units may be used since the optical system can be used even in a case where the system is enlarged or reduced in proportion. Further, the following each table describes numerical values rounded off to predetermined decimal places.

TABLE 1

Example 1

| Si | Ri | Di | Ndj | vdj |
|---|---|---|---|---|
| 1 | 32.3262 | 4.2300 | 1.95375 | 32.32 |
| 2 | 66.8687 | 0.1300 | | |
| 3 | 21.5069 | 5.2100 | 1.48749 | 70.24 |
| 4 | 111.0969 | 0.0500 | | |
| 5 | 92.4044 | 1.6000 | 1.69895 | 30.13 |
| 6 | 15.4525 | 7.9080 | | |
| 7(St) | ∞ | 10.2110 | | |
| 8 | −18.1789 | 2.3600 | 1.59282 | 68.62 |
| 9 | −15.6330 | 1.0500 | 1.59270 | 35.31 |
| 10 | −39.9853 | 0.6800 | | |
| 11 | −59.5014 | 2.9600 | 1.78800 | 47.37 |
| 12 | −32.4883 | 0.1000 | | |
| 13 | −93.3949 | 3.6500 | 1.81600 | 46.62 |
| 14 | −32.4022 | 1.2600 | | |
| 15 | 200.7689 | 6.9300 | 1.69680 | 55.53 |
| 16 | −42.0100 | 1.4700 | 1.60342 | 38.03 |
| 17 | ∞ | 4.8700 | | |
| 18 | −85.0921 | 1.4400 | 1.51633 | 64.14 |
| 19 | −328.1791 | 30.0000 | | |
| 20 | ∞ | 3.2500 | 1.51680 | 64.20 |
| 21 | ∞ | 0.8182 | | |

TABLE 2

Example 1

| | |
|---|---|
| f | 62.12 |
| Bf | 32.96 |
| FNo. | 2.87 |
| 2ω[°] | 51.6 |

Figure 9:
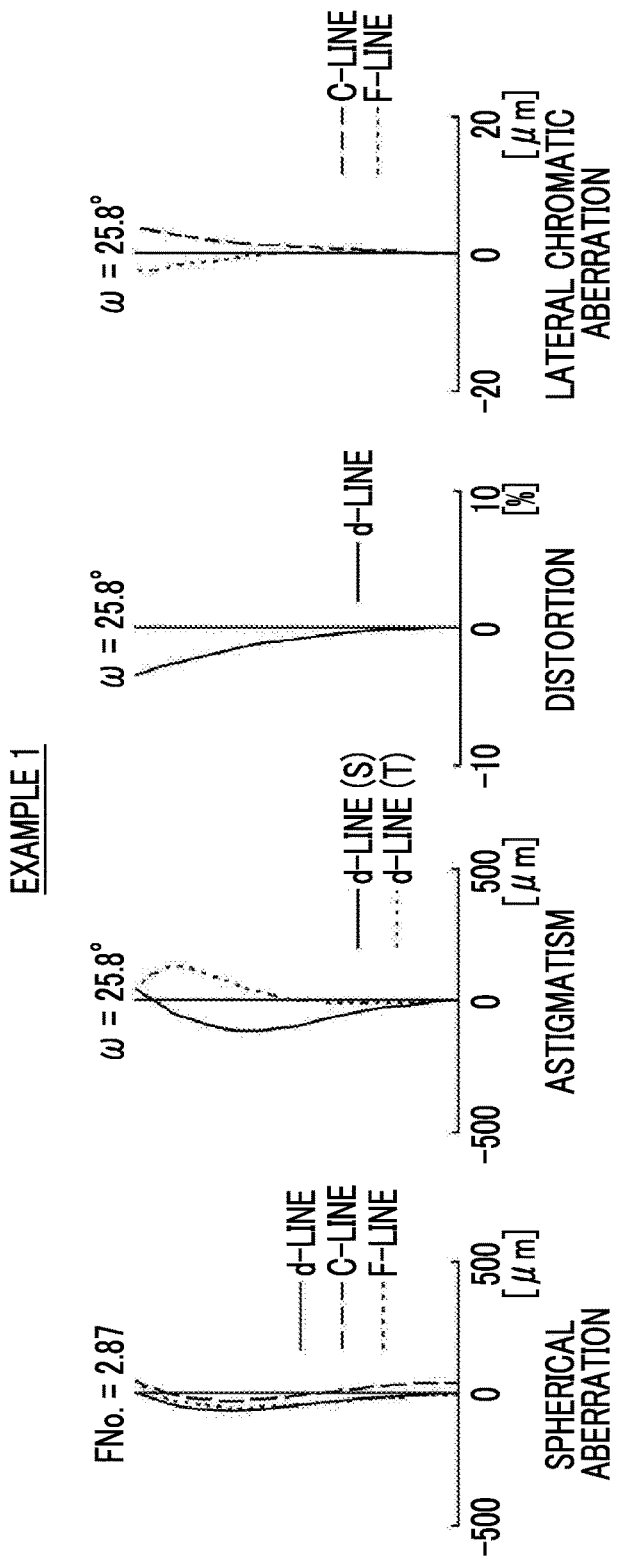
FIG. 9 is a diagram of aberrations of the imaging lens of Example 1 of the present invention, where the diagram includes spherical aberration diagram, astigmatism diagram, distortion diagram, and lateral chromatic aberration diagram, in order from the left side thereof.

FIG. 9 shows aberration diagrams in a state where an infinite distance object is brought into focus through the imaging lens of Example 1. In order from the left side of FIG. 9, spherical aberration, astigmatism, distortion, and lateral chromatic aberration (chromatic aberration of magnification) are shown. In the spherical aberration diagram, aberrations at the d-line (a wavelength of 587.6 nm), the C-line (a wavelength of 656.3 nm), and the F-line (a wavelength of 486.1 nm) are respectively indicated by the solid line, the long dashed line, and the short dashed line. In the astigmatism diagram, aberration in the sagittal direction at the d-line is indicated by the solid line, and aberration in the tangential direction at the d-line is indicated by the short dashed line. In the distortion diagram, aberration at the d-line is indicated by the solid line. In the lateral chromatic aberration diagram, aberrations at the C-line and the F-line are respectively indicated by the long dashed line and the short dashed line. In the spherical aberration diagram, FNo. indicates an F number. In the other aberration diagrams, ω indicates a half angle of view.

In the description of Example 1, reference signs, meanings, and description methods of the respective data pieces are the same as those in the following examples unless otherwise noted. Therefore, in the following description, repeated description will be omitted. Further, the methods thereof shown in the cross-sectional views of the following examples are the same as that of Example 1. Thus, in the following description, repeated description about the methods shown in the drawings will be omitted.

EXAMPLE 2

Figure 2:
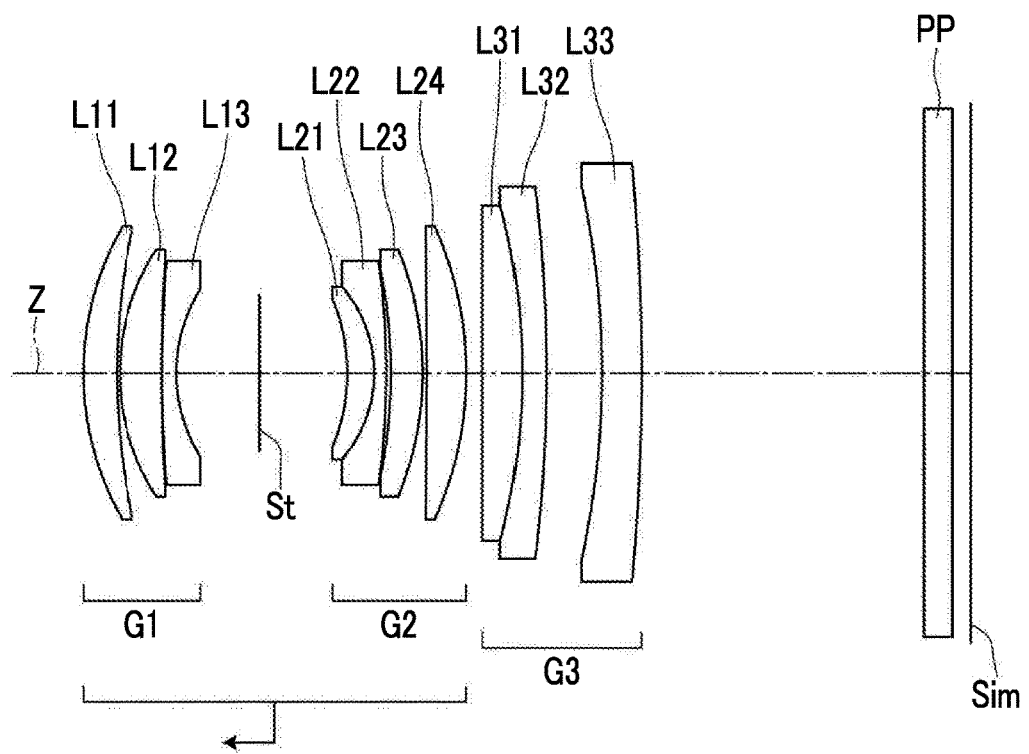
FIG. 2 is a cross-sectional view illustrating a configuration of an imaging lens of Example 2 of the present invention.
Figure 10:
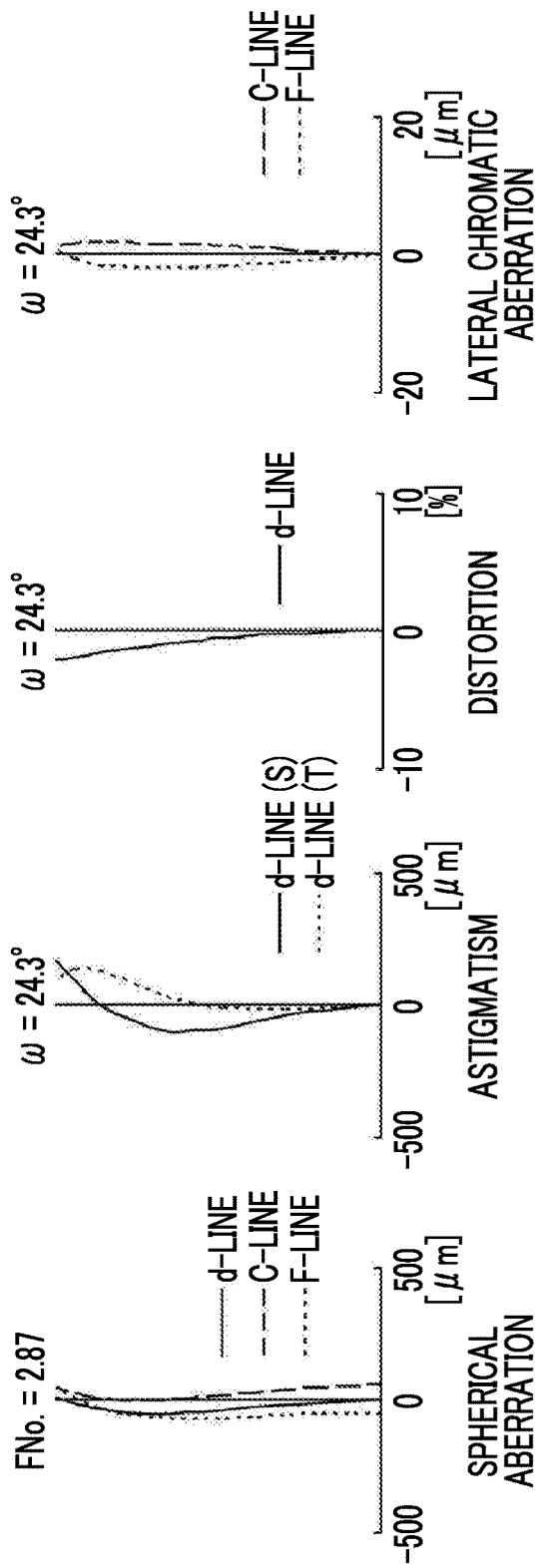
FIG. 10 is a diagram of aberrations of the imaging lens of Example 2 of the present invention, where the diagram includes spherical aberration diagram, astigmatism diagram, distortion diagram, and lateral chromatic aberration diagram, in order from the left side thereof.

FIG. 2 is a cross-sectional view of an imaging lens of Example 2. The group configuration of the imaging lens of Example 2 is the same as that of Example 1. The first lens group G1 includes three lenses, that is, lenses L11 to L13 in order from the object side, the second lens group G2 includes four lenses, that is, lenses L21 to L24 in order from the object side, and the third lens group G3 includes three lenses, that is, lenses L31 to L33 in order from the object side. Table 3 shows basic lens data of the imaging lens of Example 2, Table 4 shows specification, and FIG. 10 shows aberration diagrams thereof.

TABLE 3

Example 2

| Si | Ri | Di | Ndj | vdj |
|---|---|---|---|---|
| 1 | 31.8182 | 3.5800 | 1.95375 | 32.32 |
| 2 | 72.8369 | 0.2900 | | |
| 3 | 24.3719 | 4.4900 | 1.51633 | 64.14 |
| 4 | 178.2414 | 0.0390 | | |
| 5 | 147.5914 | 1.5300 | 1.69895 | 30.13 |
| 6 | 17.1429 | 8.8100 | | |
| 7(St) | ∞ | 9.2900 | | |
| 8 | −20.9076 | 2.8500 | 1.59282 | 68.62 |
| 9 | −14.2322 | 1.2700 | 1.59270 | 35.31 |
| 10 | −93.3345 | 0.5000 | | |
| 11 | −55.8489 | 3.3600 | 2.00100 | 29.13 |
| 12 | −35.3295 | 0.4200 | | |
| 13 | −959.4877 | 4.2100 | 1.74320 | 49.34 |
| 14 | −38.5200 | 1.6800 | | |
| 15 | ∞ | 4.2000 | 1.72916 | 54.68 |
| 16 | −71.1866 | 2.5300 | 1.59270 | 35.31 |
| 17 | −167.9940 | 5.8800 | | |
| 18 | −93.3352 | 4.2000 | 1.67270 | 32.10 |
| 19 | −247.0457 | 30.0000 | | |
| 20 | ∞ | 3.0000 | 1.51680 | 64.20 |
| 21 | ∞ | 1.9221 | | |

TABLE 4

Example 2

| | |
|---|---|
| f | 65.46 |
| Bf | 33.90 |
| FNo. | 2.87 |
| 2ω[°] | 48.6 |

EXAMPLE 3

Figure 3:
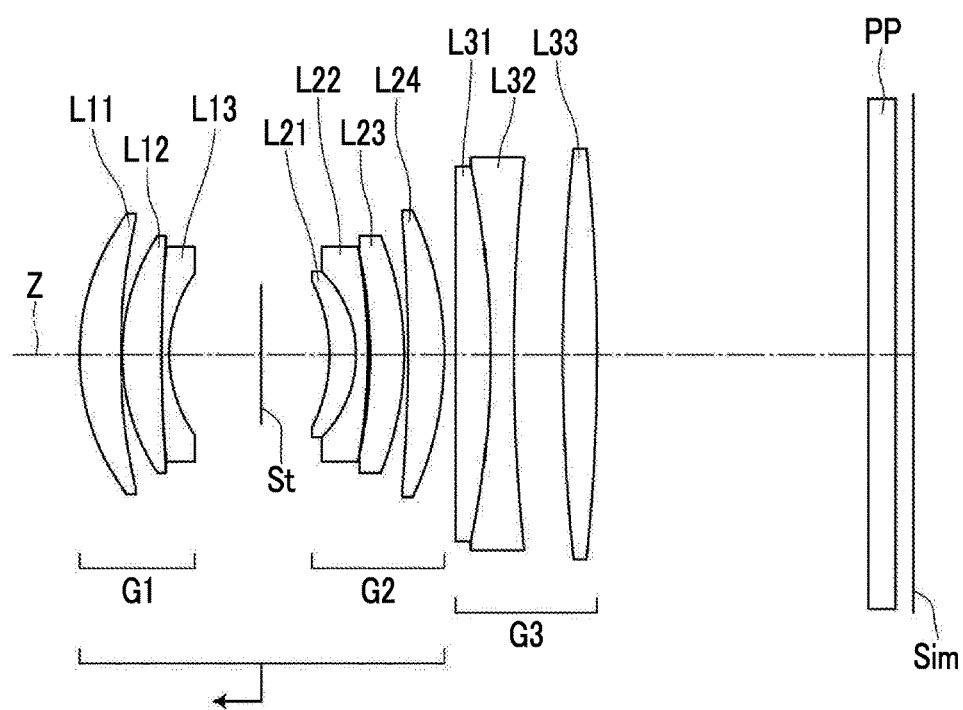
FIG. 3 is a cross-sectional view illustrating a configuration of an imaging lens of Example 3 of the present invention.
Figure 11:
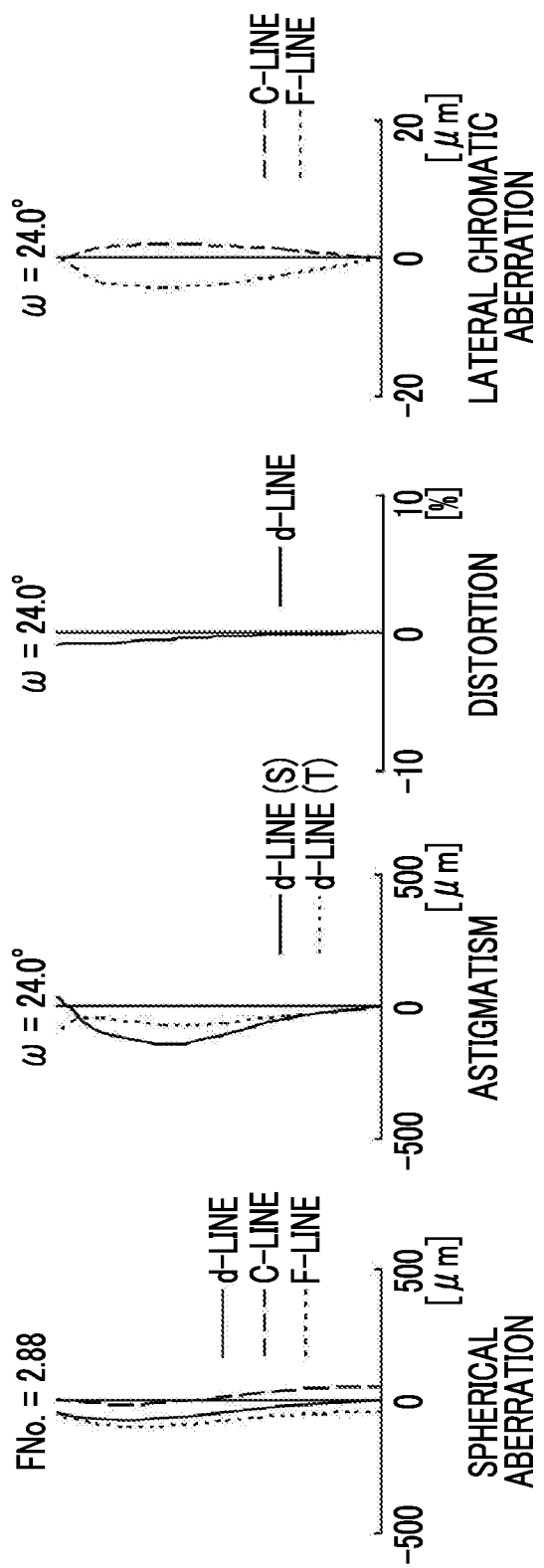
FIG. 11 is a diagram of aberrations of the imaging lens of Example 3 of the present invention, where the diagram includes spherical aberration diagram, astigmatism diagram, distortion diagram, and lateral chromatic aberration diagram, in order from the left side thereof.

FIG. 3 is a cross-sectional view of an imaging lens of Example 3. The group configuration of the imaging lens of Example 3 is the same as that of Example 1. The first lens group G1 includes three lenses, that is, lenses L11 to L13 in order from the object side, the second lens group G2 includes four lenses, that is, lenses L21 to L24 in order from the object side, and the third lens group G3 includes three lenses, that is, lenses L31 to L33 in order from the object side. Table 5 shows basic lens data of the imaging lens of Example 3, Table 6 shows specification, and FIG. 11 shows aberration diagrams thereof.

TABLE 5

Example 3

| Si | Ri | Di | Ndj | vdj |
|---|---|---|---|---|
| 1 | 25.9959 | 4.5800 | 1.83481 | 42.72 |
| 2 | 67.9810 | 0.2000 | | |
| 3 | 24.4138 | 4.3100 | 1.51633 | 64.14 |
| 4 | 149.7073 | 0.0390 | | |
| 5 | 140.7795 | 0.8400 | 1.63980 | 34.47 |
| 6 | 15.8829 | 10.1617 | | |
| 7(St) | ∞ | 7.5000 | | |
| 8 | −18.1394 | 2.9400 | 1.59282 | 68.62 |
| 9 | −13.1502 | 1.2700 | 1.59270 | 35.31 |
| 10 | −66.6670 | 0.2700 | | |
| 11 | −54.1978 | 3.7600 | 2.00100 | 29.13 |
| 12 | −35.0404 | 0.4200 | | |
| 13 | −180.8773 | 4.0000 | 1.74320 | 49.34 |
| 14 | −38.7183 | 1.2600 | | |
| 15 | ∞ | 3.7800 | 1.72916 | 54.68 |
| 16 | −105.3546 | 2.5300 | 1.68893 | 31.07 |
| 17 | 209.9896 | 5.4100 | | |
| 18 | 224.9639 | 3.7800 | 1.88300 | 40.80 |
| 19 | −224.9639 | 30.0000 | | |
| 20 | ∞ | 3.0000 | 1.51680 | 64.20 |
| 21 | ∞ | 1.9285 | | |

TABLE 6

Example 3

| | |
|---|---|
| f | 65.74 |
| Bf | 33.91 |
| FNo. | 2.88 |
| 2ω[°] | 48.0 |

EXAMPLE 4

Figure 4:
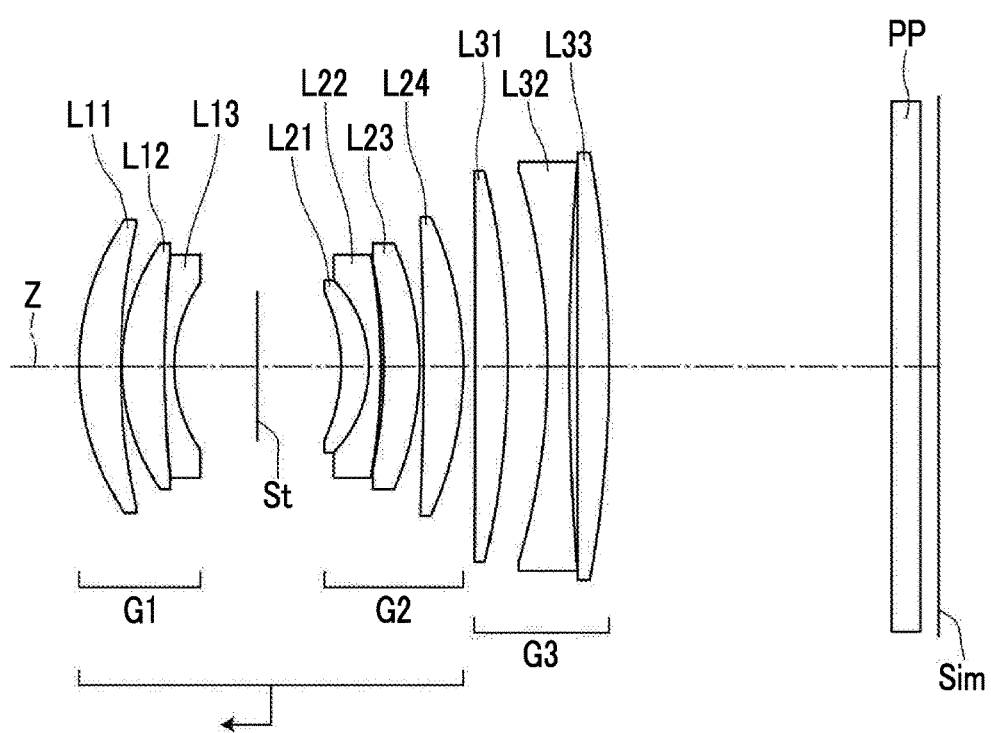
FIG. 4 is a cross-sectional view illustrating a configuration of an imaging lens of Example 4 of the present invention.
Figure 12:
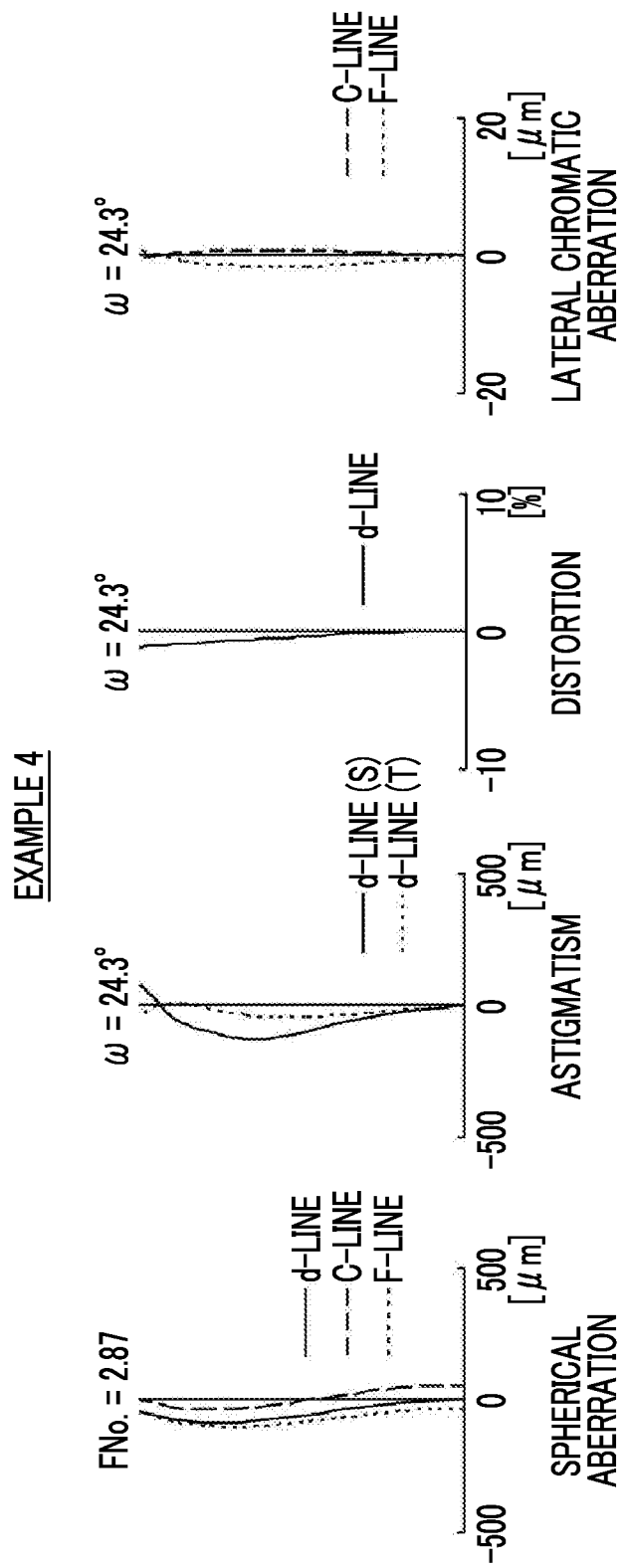
FIG. 12 is a diagram of aberrations of the imaging lens of Example 4 of the present invention, where the diagram includes spherical aberration diagram, astigmatism diagram, distortion diagram, and lateral chromatic aberration diagram, in order from the left side thereof.

FIG. 4 is a cross-sectional view of an imaging lens of Example 4. The group configuration of the imaging lens of Example 4 is the same as that of Example 1. The first lens group G1 includes three lenses, that is, lenses L11 to L13 in order from the object side, the second lens group G2 includes four lenses, that is, lenses L21 to L24 in order from the object side, and the third lens group G3 includes three lenses, that is, lenses L31 to L33 in order from the object side. Table 7 shows basic lens data of the imaging lens of Example 4, Table 8 shows specification, and FIG. 12 shows aberration diagrams thereof.

TABLE 7

Example 4

| Si | Ri | Di | Ndj | vdj |
|---|---|---|---|---|
| 1 | 27.9528 | 4.4286 | 1.83481 | 42.72 |
| 2 | 67.2241 | 0.2000 | | |
| 3 | 23.6128 | 4.5011 | 1.51633 | 64.14 |
| 4 | 127.1184 | 0.0100 | | |
| 5 | 112.8541 | 1.0140 | 1.63980 | 34.47 |
| 6 | 16.0570 | 8.8196 | | |
| 7(St) | ∞ | 8.8370 | | |
| 8 | −18.8301 | 2.9400 | 1.59282 | 68.62 |

TABLE 7-continued

Example 4

| Si | Ri | Di | Ndj | νdj |
|---|---|---|---|---|
| 9 | −13.3804 | 1.2701 | 1.59270 | 35.31 |
| 10 | −66.6656 | 0.3191 | | |
| 11 | −52.5261 | 3.7804 | 2.00100 | 29.13 |
| 12 | −33.7983 | 0.4204 | | |
| 13 | −320.6735 | 4.2000 | 1.74320 | 49.34 |
| 14 | −39.2668 | 1.2600 | | |
| 15 | −2705.5138 | 3.3597 | 1.62334 | 65.17 |
| 16 | −93.3343 | 4.2004 | | |
| 17 | −74.0000 | 2.3096 | 1.67702 | 31.64 |
| 18 | 288.4012 | 0.8396 | | |
| 19 | 3614.1596 | 3.3604 | 1.88300 | 40.80 |
| 20 | −131.8879 | 30.0000 | | |
| 21 | ∞ | 3.0000 | 1.51680 | 64.20 |
| 22 | ∞ | 1.9578 | | |

TABLE 8

Example 4

| | |
|---|---|
| f | 64.88 |
| Bf | 33.94 |
| FNo. | 2.87 |
| 2ω[°] | 48.6 |

EXAMPLE 5

Figure 5:
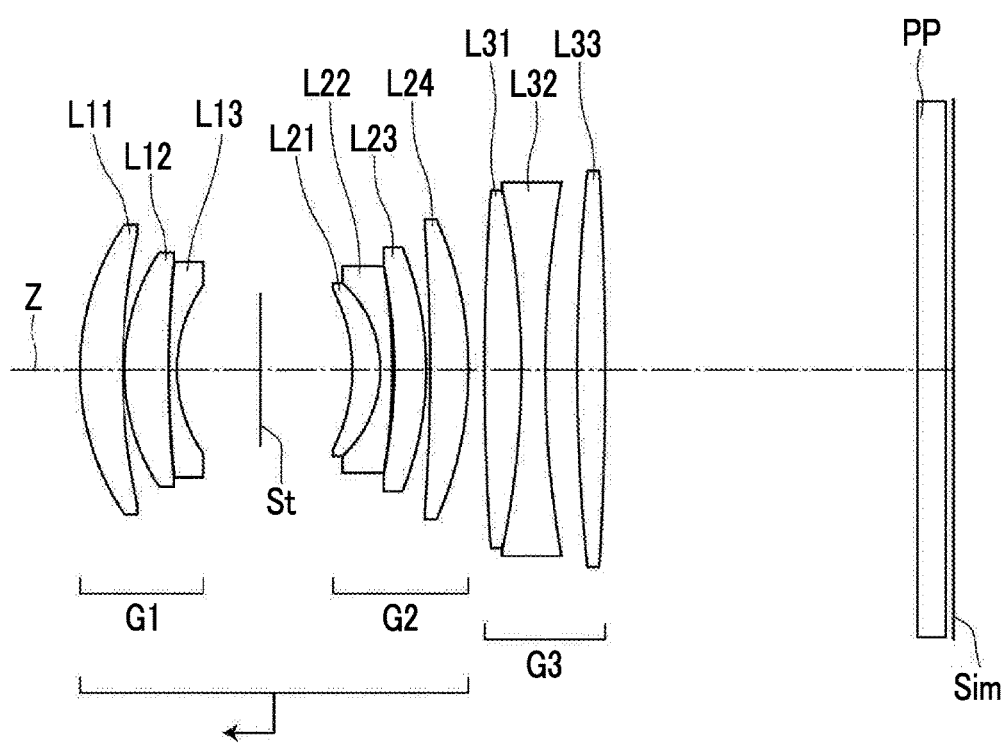
FIG. 5 is a cross-sectional view illustrating a configuration of an imaging lens of Example 5 of the present invention.
Figure 13:
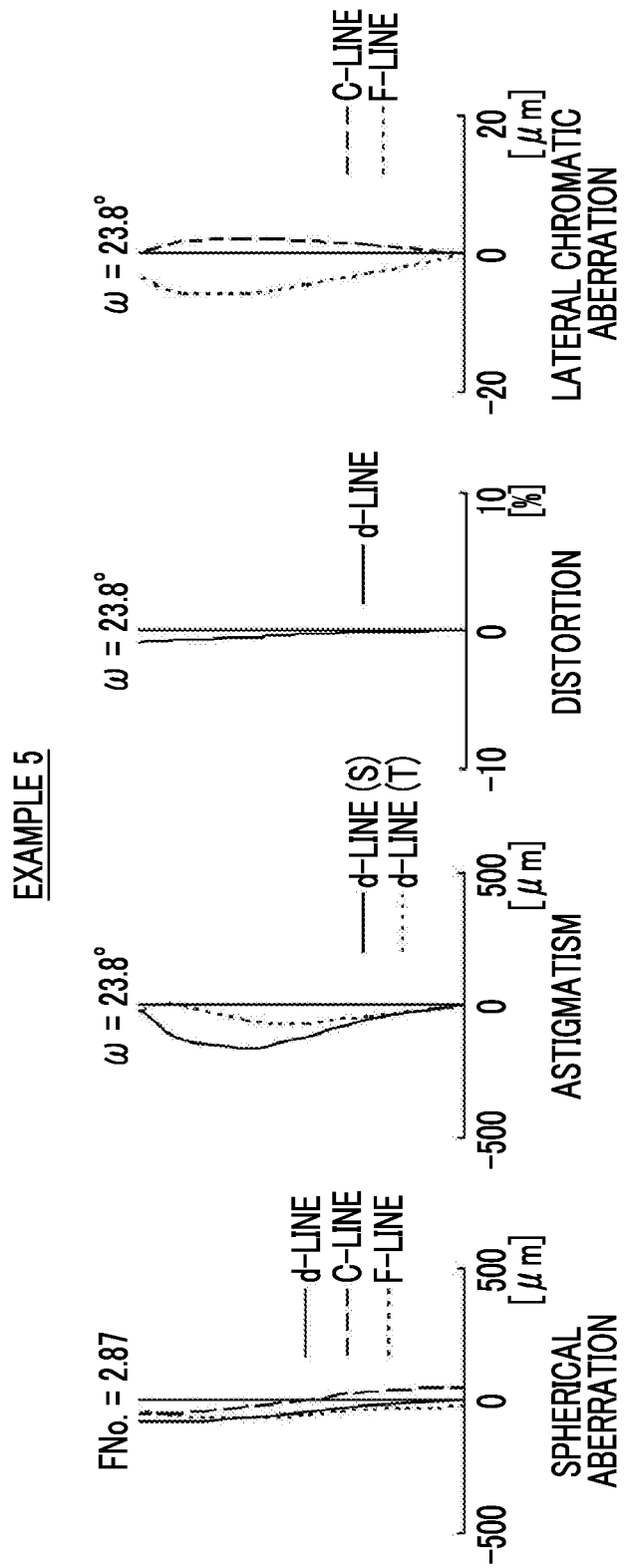
FIG. 13 is a diagram of aberrations of the imaging lens of Example 5 of the present invention, where the diagram includes spherical aberration diagram, astigmatism diagram, distortion diagram, and lateral chromatic aberration diagram, in order from the left side thereof.

FIG. 5 is a cross-sectional view of an imaging lens of Example 5. The group configuration of the imaging lens of Example 5 is the same as that of Example 1. The first lens group G1 includes three lenses, that is, lenses L11 to L13 in order from the object side, the second lens group G2 includes four lenses, that is, lenses L21 to L24 in order from the object side, and the third lens group G3 includes three lenses, that is, lenses L31 to L33 in order from the object side. Table 9 shows basic lens data of the imaging lens of Example 5, Table 10 shows specification, and FIG. 13 shows aberration diagrams thereof.

TABLE 9

Example 5

| Si | Ri | Di | Ndj | νdj |
|---|---|---|---|---|
| 1 | 27.9275 | 4.5500 | 1.83481 | 42.72 |
| 2 | 67.2820 | 0.2100 | | |
| 3 | 23.2448 | 4.6600 | 1.51633 | 64.14 |
| 4 | 122.3460 | 0.0385 | | |
| 5 | 109.3991 | 0.8400 | 1.64109 | 34.21 |
| 6 | 15.9165 | 8.8200 | | |
| 7(St) | ∞ | 9.7000 | | |
| 8 | −18.6461 | 2.9400 | 1.64279 | 64.42 |
| 9 | −12.7467 | 1.2700 | 1.59270 | 35.31 |
| 10 | −66.6677 | 0.2100 | | |
| 11 | −54.4539 | 3.3600 | 1.92119 | 23.96 |
| 12 | −35.1373 | 0.4200 | | |
| 13 | −201.7645 | 4.0400 | 1.74320 | 49.34 |
| 14 | −39.9237 | 1.6900 | | |
| 15 | 275.2840 | 3.7900 | 1.71322 | 61.14 |
| 16 | −93.3333 | 2.5400 | 1.64007 | 34.28 |
| 17 | 119.9969 | 3.3600 | | |
| 18 | 209.9983 | 2.9500 | 1.85001 | 43.00 |
| 19 | −364.2160 | 33.0000 | | |
| 20 | ∞ | 3.0000 | 1.51680 | 64.20 |
| 21 | ∞ | 0.8170 | | |

TABLE 10

Example 5

| | |
|---|---|
| f | 66.37 |
| Bf | 35.79 |
| FNo. | 2.87 |
| 2ω[°] | 47.6 |

EXAMPLE 6

Figure 6:
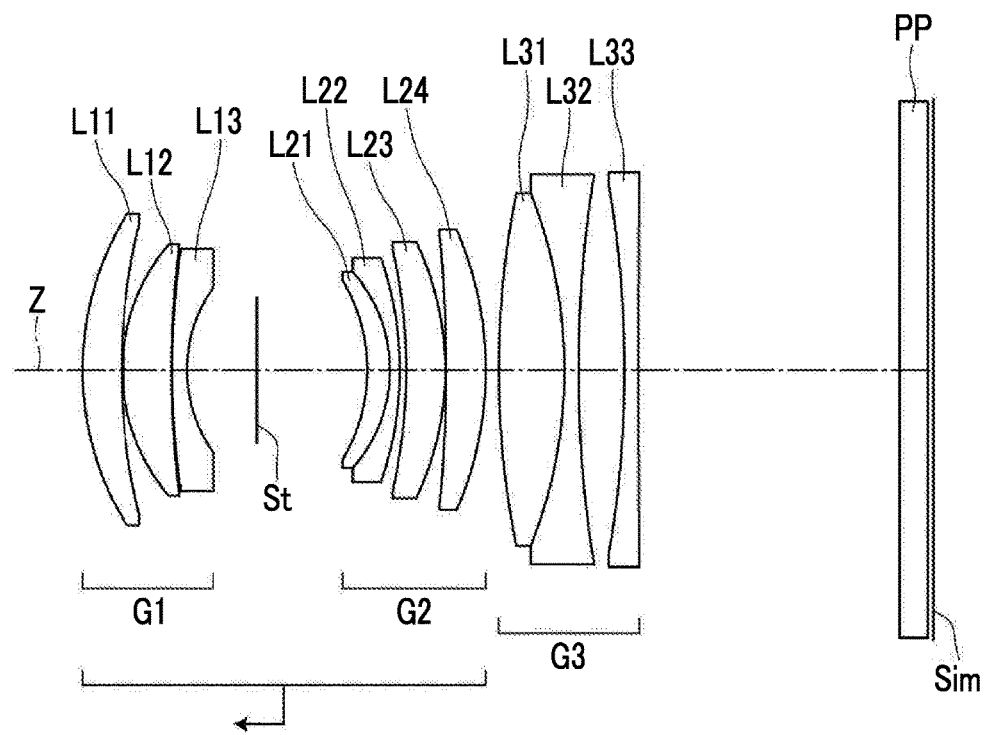
FIG. 6 is a cross-sectional view illustrating a configuration of an imaging lens of Example 6 of the present invention.
Figure 14:
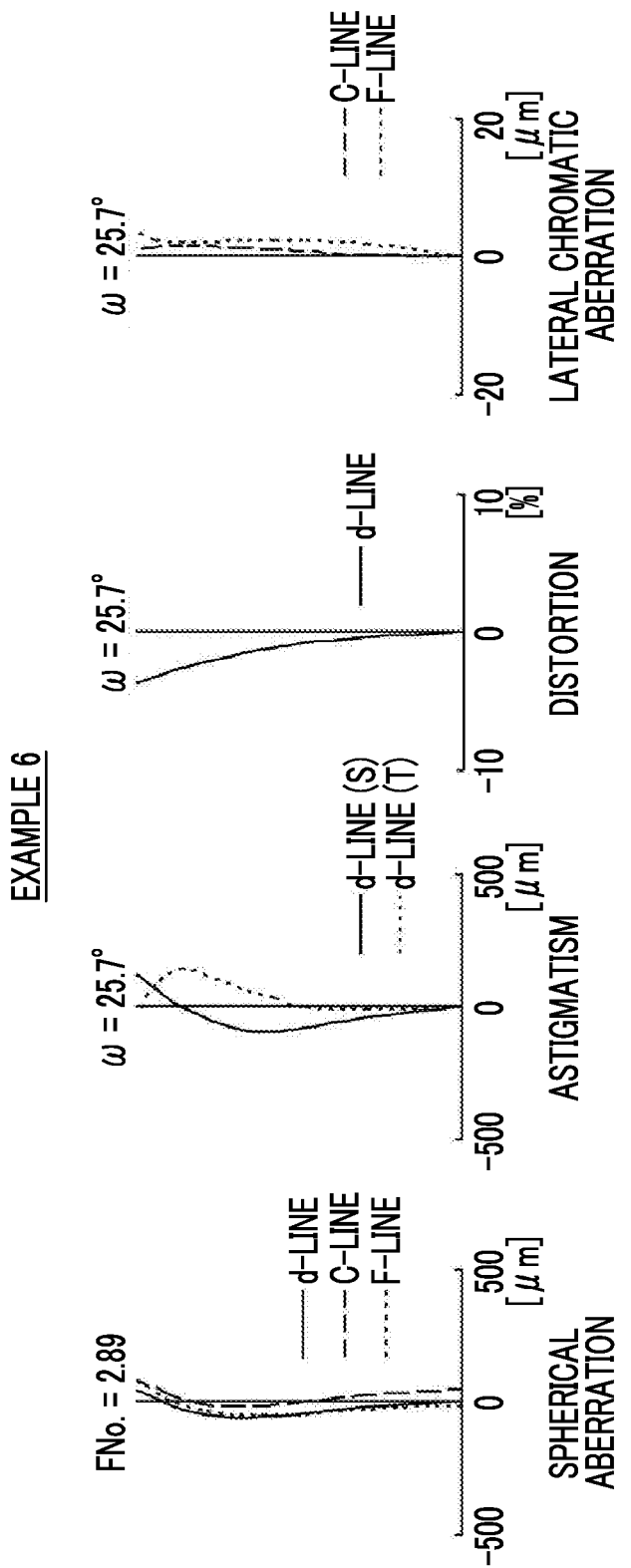
FIG. 14 is a diagram of aberrations of the imaging lens of Example 6 of the present invention, where the diagram includes spherical aberration diagram, astigmatism diagram, distortion diagram, and lateral chromatic aberration diagram, in order from the left side thereof.

FIG. 6 is a cross-sectional view of an imaging lens of Example 6. A group configuration of the imaging lens of Example 6 is the same as that of Example 1 except that the third lens group G3 has a negative refractive power. The first lens group G1 includes three lenses, that is, lenses L11 to L13 in order from the object side, the second lens group G2 includes four lenses, that is, lenses L21 to L24 in order from the object side, and the third lens group G3 includes three lenses, that is, lenses L31 to L33 in order from the object side. Table 11 shows basic lens data of the imaging lens of Example 6, Table 12 shows specification, and FIG. 14 shows aberration diagrams thereof.

TABLE 11

Example 6

| Si | Ri | Di | Ndj | νdj |
|---|---|---|---|---|
| 1 | 32.0807 | 4.1600 | 1.95375 | 32.32 |
| 2 | 64.9141 | 0.1300 | | |
| 3 | 20.9422 | 5.2100 | 1.48749 | 70.24 |
| 4 | 109.2184 | 0.0500 | | |
| 5 | 91.5454 | 1.5900 | 1.69895 | 30.13 |
| 6 | 15.4158 | 7.3780 | | |
| 7(St) | ∞ | 11.7000 | | |
| 8 | −18.8939 | 2.3900 | 1.59282 | 68.62 |
| 9 | −15.9781 | 1.0500 | 1.59270 | 35.31 |
| 10 | −37.0896 | 0.6800 | | |
| 11 | −58.4714 | 4.1300 | 1.78800 | 47.37 |
| 12 | −32.2205 | 0.0900 | | |
| 13 | −152.8444 | 4.2000 | 1.81600 | 46.62 |
| 14 | −38.2710 | 1.2900 | | |
| 15 | 97.9518 | 6.9400 | 1.69680 | 55.53 |
| 16 | −52.3250 | 1.4900 | 1.60342 | 38.03 |
| 17 | 133.4858 | 4.8700 | | |
| 18 | −120.0034 | 1.4800 | 1.75500 | 52.32 |
| 19 | 3200.1859 | 27.7298 | | |
| 20 | ∞ | 3.0000 | 1.51680 | 64.20 |
| 21 | ∞ | 0.5692 | | |

TABLE 12

Example 6

| | |
|---|---|
| f | 62.41 |
| Bf | 30.28 |
| FNo. | 2.89 |
| 2ω[°] | 51.4 |

EXAMPLE 7

Figure 7:
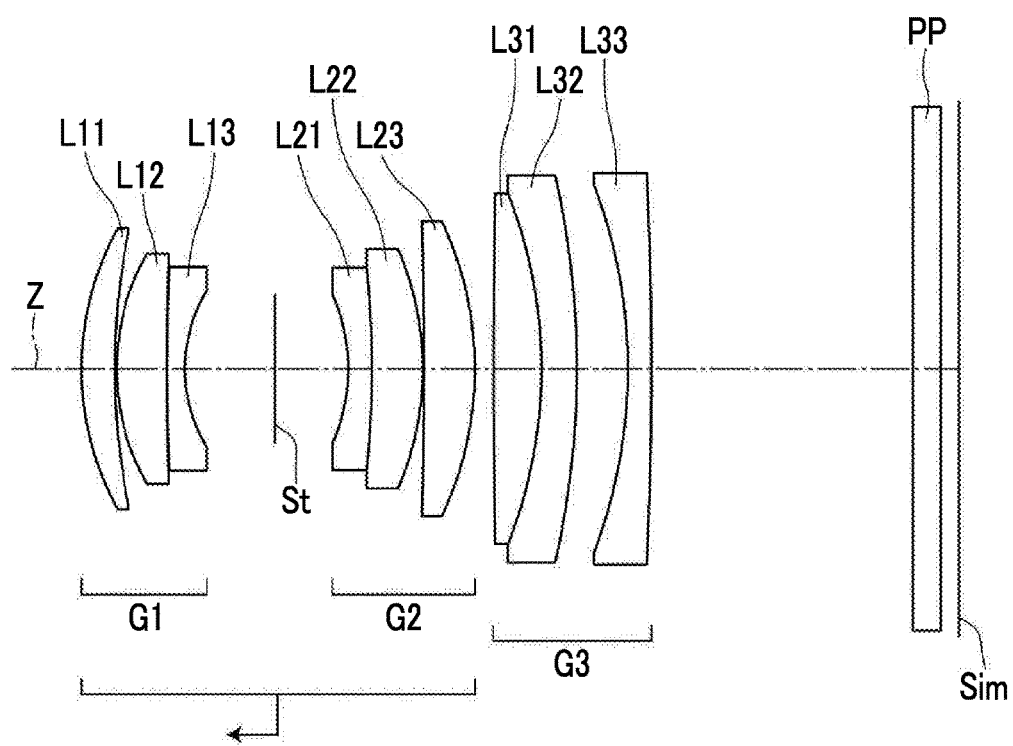
FIG. 7 is a cross-sectional view illustrating a configuration of an imaging lens of Example 7 of the present invention.
Figure 15:
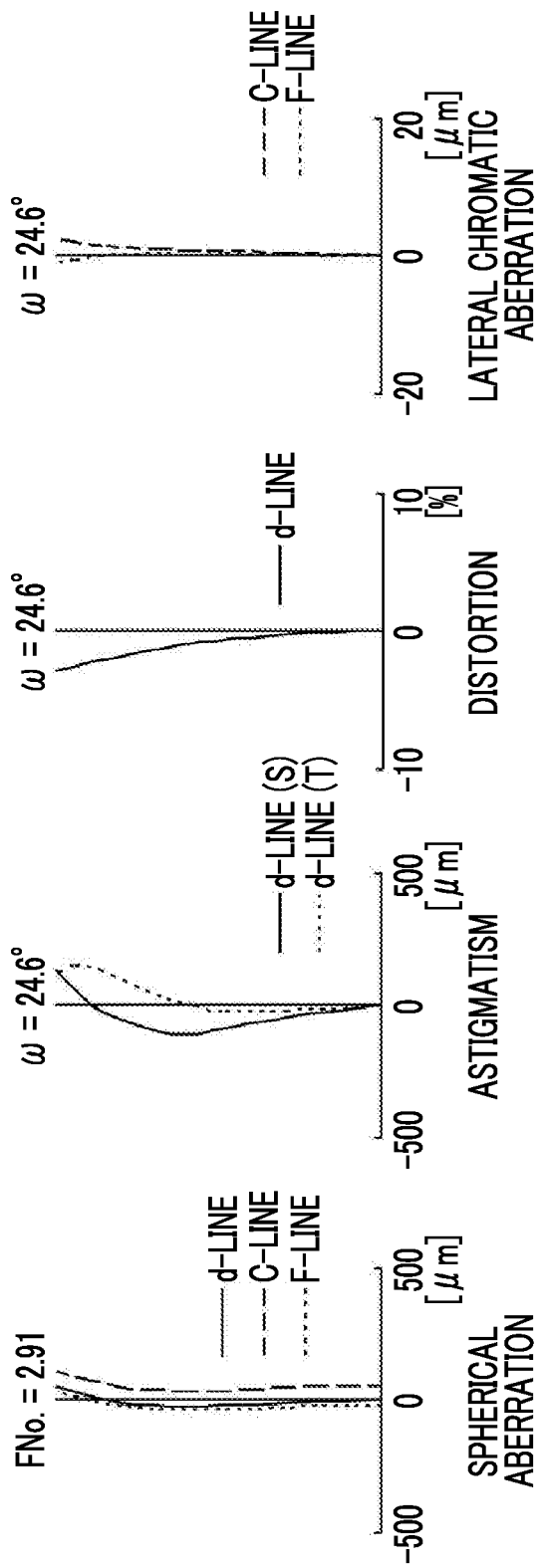
FIG. 15 is a diagram of aberrations of the imaging lens of Example 7 of the present invention, where the diagram includes spherical aberration diagram, astigmatism diagram, distortion diagram, and lateral chromatic aberration diagram, in order from the left side thereof.

FIG. 7 is a cross-sectional view of an imaging lens of Example 7. The group configuration of the imaging lens of Example 7 is the same as that of Example 1. The first lens group G1 includes three lenses, that is, lenses L11 to L13 in order from the object side, the second lens group G2 includes three lenses, that is, lenses L21 to L23 in order from the object side, and the third lens group G3 includes three lenses, that is, lenses L31 to L33 in order from the object side. Table 13 shows basic lens data of the imaging lens of Example 7, Table 14 shows specification, and FIG. 15 shows aberration diagrams thereof.

TABLE 13

Example 7

| Si | Ri | Di | Ndj | vdj |
|---|---|---|---|---|
| 1 | 31.9198 | 3.5500 | 1.88300 | 40.76 |
| 2 | 72.9720 | 0.2087 | | |
| 3 | 25.0232 | 5.4400 | 1.48749 | 70.24 |
| 4 | 359.6764 | 0.0390 | | |
| 5 | 258.2155 | 1.8800 | 1.60342 | 38.03 |
| 6 | 16.5719 | 9.6200 | | |
| 7(St) | ∞ | 7.8300 | | |
| 8 | −20.2655 | 2.5200 | 1.72825 | 28.46 |
| 9 | −108.0074 | 5.4400 | 1.78590 | 44.20 |
| 10 | −33.1607 | 0.1180 | | |
| 11 | −576.0779 | 5.4400 | 1.74320 | 49.34 |
| 12 | −38.0020 | 2.0000 | | |
| 13 | 1014.2223 | 5.0200 | 1.69680 | 55.53 |
| 14 | −52.2767 | 3.7800 | 1.60342 | 38.03 |
| 15 | −95.7110 | 5.4400 | | |
| 16 | −56.8129 | 2.5100 | 1.51633 | 64.14 |
| 17 | −448.9119 | 28.0000 | | |
| 18 | ∞ | 3.0000 | 1.51680 | 64.20 |
| 19 | ∞ | 1.9398 | | |

TABLE 14

Example 7

| | |
|---|---|
| f | 65.35 |
| Bf | 31.92 |
| FNo. | 2.91 |
| 2ω[°] | 49.2 |

EXAMPLE 8

Figure 8:
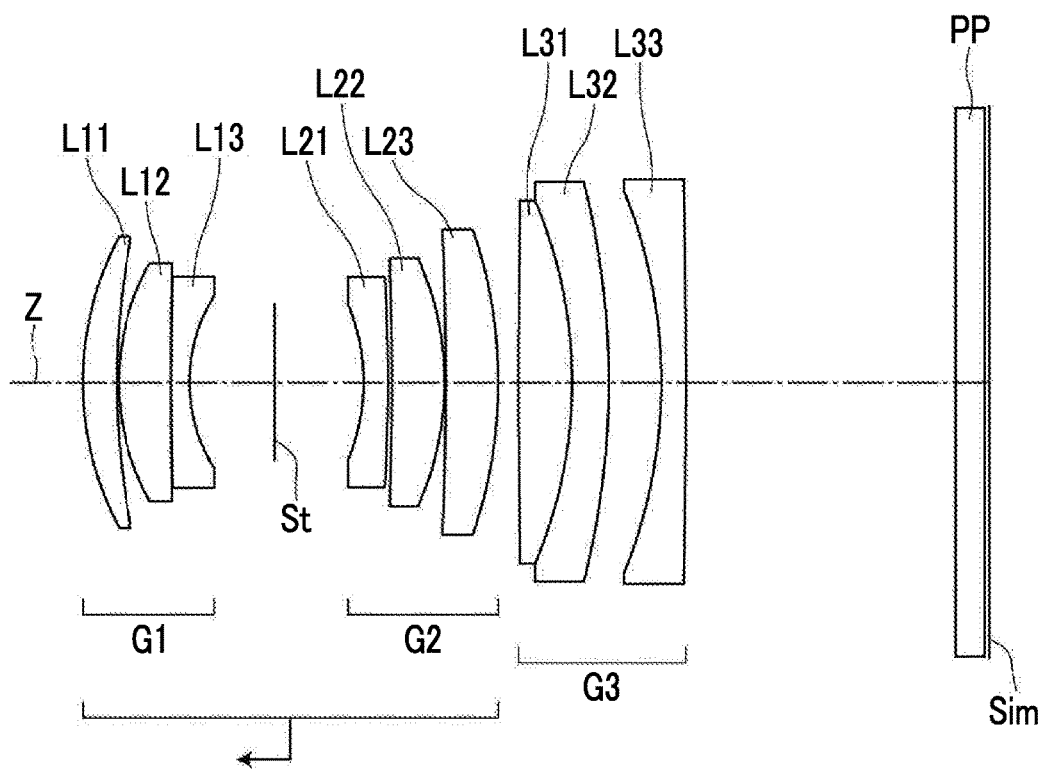
FIG. 8 is a cross-sectional view illustrating a configuration of an imaging lens of Example 8 of the present invention.
Figure 16:
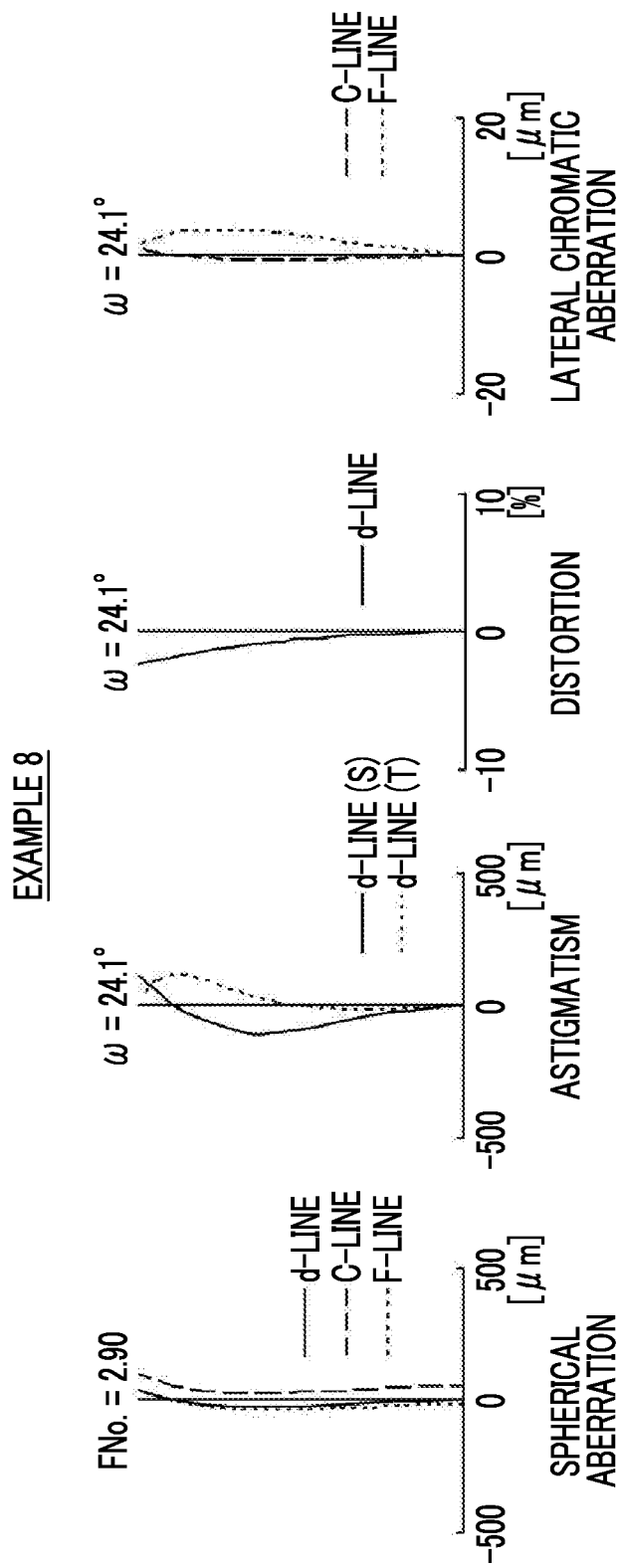
FIG. 16 is a diagram of aberrations of the imaging lens of Example 8 of the present invention, where the diagram includes spherical aberration diagram, astigmatism diagram, distortion diagram, and lateral chromatic aberration diagram, in order from the left side thereof.

FIG. 8 is a cross-sectional view of an imaging lens of Example 8. The group configuration of the imaging lens of Example 8 is the same as that of Example 1. The first lens group G1 includes three lenses, that is, lenses L11 to L13 in order from the object side, the second lens group G2 includes three lenses, that is, lenses L21 to L23 in order from the object side, and the third lens group G3 includes three lenses, that is, lenses L31 to L33 in order from the object side. Table 15 shows basic lens data of the imaging lens of Example 8, Table 16 shows specification, and FIG. 16 shows aberration diagrams thereof.

TABLE 15

Example 8

| Si | Ri | Di | Ndj | vdj |
|---|---|---|---|---|
| 1 | 32.5849 | 3.5500 | 1.88300 | 40.76 |
| 2 | 77.5887 | 0.2100 | | |
| 3 | 25.6004 | 5.4400 | 1.48749 | 70.24 |
| 4 | 634.8097 | 0.0383 | | |
| 5 | 400.8580 | 1.8800 | 1.60342 | 38.03 |
| 6 | 17.1994 | 8.7900 | | |
| 7(St) | ∞ | 9.2100 | | |
| 8 | −21.3086 | 2.5100 | 1.72825 | 28.46 |
| 9 | −181.9249 | 0.4200 | | |
| 10 | −312.7120 | 5.4400 | 1.78590 | 44.20 |
| 11 | −32.0629 | 0.1200 | | |
| 12 | −396.9838 | 5.4400 | 1.78800 | 47.37 |
| 13 | −49.4639 | 2.1000 | | |
| 14 | 1125.9577 | 5.4400 | 1.69680 | 55.53 |
| 15 | −49.1602 | 3.7800 | 1.60342 | 38.03 |
| 16 | −86.5860 | 5.4400 | | |
| 17 | −53.9136 | 2.5100 | 1.51633 | 64.14 |
| 18 | −1130.4433 | 28.0000 | | |
| 19 | ∞ | 3.0000 | 1.51680 | 64.20 |
| 20 | ∞ | 0.4694 | | |

TABLE 16

Example 8

| | |
|---|---|
| f | 66.52 |
| Bf | 30.45 |
| FNo. | 2.90 |
| 2ω[°] | 48.2 |

Table 17 shows values corresponding to the conditional expressions (1) to (7) of the imaging lenses of Examples 1 to 8 and values of TL/IH mentioned above. The values shown in Table 17 are based on the d-line.

TABLE 17

| Expression number | Conditional expression | Example 1 | Example 2 | Example 3 | Example 4 | Example 5 | Example 6 | Example 7 | Example 8 |
|---|---|---|---|---|---|---|---|---|---|
| (1) | R1Yr/R1Zf | 1.20 | 1.21 | 1.06 | 1.13 | 1.12 | 1.19 | 1.39 | 1.58 |
| (2) | \|f/f3\| | 0.086 | 0.073 | 0.333 | 0.137 | 0.295 | 0.103 | 0.080 | 0.056 |
| (3) | v1Y − v1Z | 40.11 | 34.01 | 29.67 | 29.67 | 29.93 | 40.11 | 32.21 | 32.21 |
| (4) | f/f2 | 0.98 | 0.89 | 0.57 | 0.78 | 0.61 | 1.11 | 0.85 | 0.82 |
| (5) | f/f1 | 0.33 | 0.44 | 0.64 | 0.56 | 0.58 | 0.35 | 0.47 | 0.51 |
| (6) | R21f/f2 | −0.29 | −0.28 | −0.16 | −0.23 | −0.17 | −0.34 | −0.26 | −0.26 |
| (7) | Bf/f | 0.531 | 0.518 | 0.516 | 0.523 | 0.539 | 0.485 | 0.488 | 0.458 |
| | TL/IH | 3.07 | 3.21 | 3.14 | 3.10 | 3.14 | 2.85 | 3.20 | 3.20 |

As can be seen from the above-mentioned data, the imaging lenses of Examples 1 to 8 were configured to have values of TL/IH in a range of 2.85 to 3.21 and to have small sizes. Thereby, each aberration was satisfactorily corrected, and high optical performance was achieved.

Figure 17A:
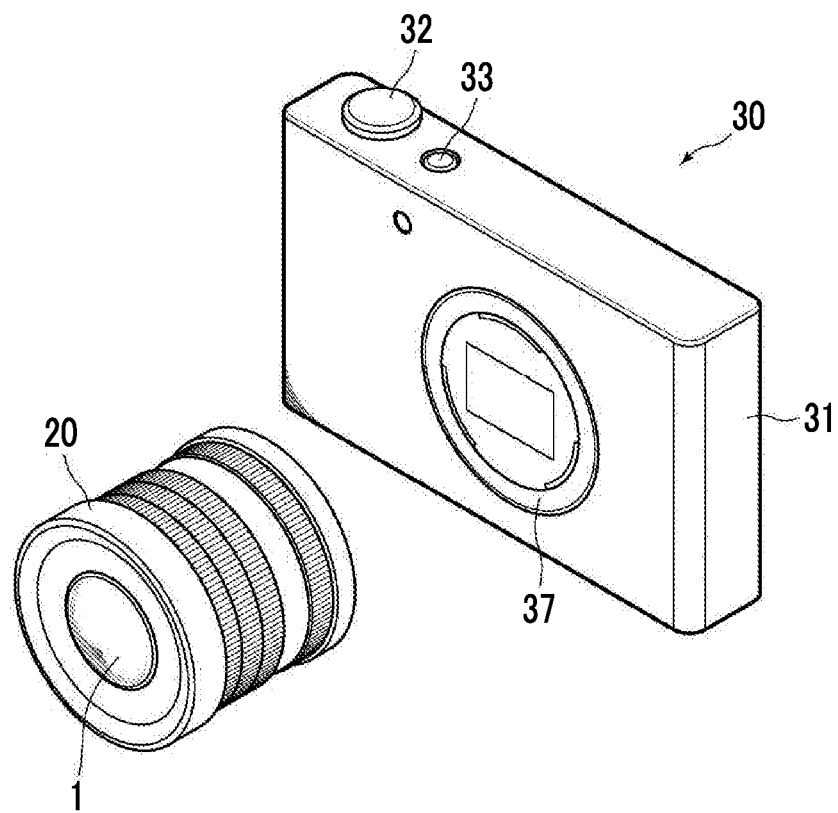
FIG. 17A is a perspective view of the front side of an imaging apparatus according to an embodiment of the present invention.
Figure 17B:
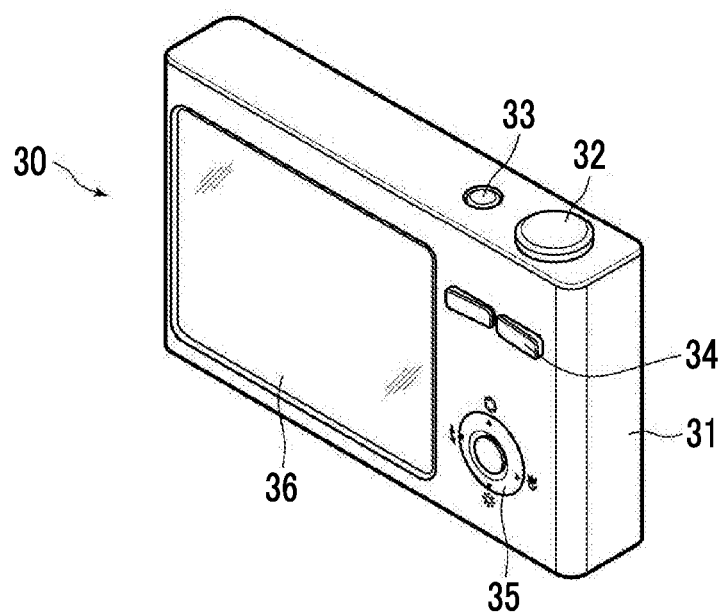
FIG. 17B is a perspective view of the rear side of an imaging apparatus according to the embodiment of the present invention.

Next, an imaging apparatus according to embodiment of the present invention will be described. FIGS. 17A and 17B are external views of a camera 30 which is the imaging apparatus according to the embodiment of the present invention. FIG. 17A is a perspective view of the camera 30 viewed from the front side, and FIG. 17B is a perspective view of the camera 30 viewed from the rear side. The camera 30 is a single-lens digital camera on which an interchangeable lens 20 is detachably and attachably mounted and which has no reflex finder. The interchangeable lens 20 is configured such that the imaging lens 1 according to the embodiment of the present invention is housed in a barrel.

The camera 30 comprises a camera body 31, and a shutter button 32 and a power button 33 are provided on an upper surface of the camera body 31. Further, operation sections 34 and 35 and a display section 36 are provided on a rear surface of the camera body 31. The display section 36 is for displaying a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element (not shown in the drawing), a signal processing circuit (not shown in the drawing), a recording medium (not shown in the drawing), and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing the captured image signal which is output from the imaging element. The recording medium records the generated image. The camera 30 captures a still image and/or a moving image by pressing the shutter button 32, and records image data, which is obtained through imaging, in the recording medium.

By applying the imaging lens 1 according to the embodiment of the present invention to the interchangeable lens 20 used in such a camera 30, it is possible to achieve reduction in size and capture a desired image.

The present invention has been hitherto described through embodiments and examples, but the present invention is not limited to the above-mentioned embodiments and examples, and may be modified into various forms. For example, values such as the radius of curvature, the surface distance, the refractive index, and the Abbe number of each lens component are not limited to the values shown in the numerical examples, and different values may be used therefore.

The embodiment of the imaging apparatus has described the example applied to the single-lens digital camera having no reflex finder with reference to the drawings, but the present invention is not limited to this application. For example, the present invention can also be applied to a single-lens reflex camera, a film camera, a video camera, and/or the like.

EXPLANATION OF REFERENCES

1: imaging lens
20: interchangeable lens
30: camera
31: camera body
32: shutter button
33: power button
34, 35: operation section
36: display section
37: mount
G1: first lens group
G2: second lens group
G3: third lens group
L11 to L13, L21 to L24, L31 to L33: lens
PP: optical member
Sim: image plane
St: aperture diaphragm
Z: optical axis

What is claimed is:

1. An imaging lens consists of, in order from an object side:
   a first lens group that has a positive refractive power;
   a diaphragm;
   a second lens group that has a positive refractive power; and
   a third lens group,
   wherein the first lens group includes three or more lenses, and a positive lens is disposed to be closest to the object side in the first lens group,
   wherein the second lens group includes three or more lenses, and a meniscus lens, which is concave toward the object side, is disposed to be closest to the object side in the second lens group,
   wherein the third lens group includes three or more lenses,
   wherein during focusing from an infinite distance object to a close-range object, the first lens group, the diaphragm, and the second lens group integrally move to the object side, and the third lens group remains stationary with respect to an image plane, and
   wherein the following conditional expression (1) is satisfied, $$1.01 < R1Yr/R1Zf \qquad (1),$$

where R1Yr is a radius of curvature of an image side surface of a second lens from an image side in the first lens group, and
   R1Zf is a radius of curvature of an object side surface of a lens closest to the image side in the first lens group.

2. The imaging lens according to claim 1, wherein the lens closest to the image side in the first lens group is a negative lens which is concave toward the image side.

3. The imaging lens according to claim 1, wherein the second lens from the image side in the first lens group is a positive lens which is concave toward the image side.

4. The imaging lens according to claim 1, wherein a second lens from the object side in the second lens group is a meniscus lens which is concave toward the object side.

5. The imaging lens according to claim 1,
   wherein the following conditional expression (2) is satisfied, $$|f/f3| < 0.45 \qquad (2),$$

where f is a focal length of the whole system in a state where the infinite distance object is in focus, and
   f3 is a focal length of the third lens group.

6. The imaging lens according to claim 1, wherein the third lens group consists of three lenses.

7. The imaging lens according to claim 1, wherein the first lens group consists of, in order from the object side, two positive lenses and one negative lens.

8. The imaging lens according to claim 1,
   wherein the following conditional expression (3) is satisfied, $$20 < v1Y - v1Z \qquad (3),$$

where ν1Y is an Abbe number of the second lens from the image side in the first lens group on the basis of a d-line, and ν1Z is an Abbe number of the lens closest to the image side in the first lens group on the basis of the d-line.

9. The imaging lens according to claim 1,
wherein the following conditional expression (4) is satisfied, $$0.4 < f/f2 < 1.5 \quad (4),$$

where f is the focal length of the whole system in the state where the infinite distance object is in focus, and f2 is a focal length of the second lens group.

10. The imaging lens according to claim 1,
wherein the following conditional expression (5) is satisfied, $$0.2 < f/f1 < 1 \quad (5),$$

where f is the focal length of the whole system in the state where the infinite distance object is in focus, and f1 is a focal length of the first lens group.

11. The imaging lens according to claim 1,
wherein the following conditional expression (6) is satisfied, $$-0.5 < R21f/f2 < -0.1 \quad (6),$$

where R21f is a radius of curvature of an object side surface of a lens closest to the object side in the second lens group, and f2 is a focal length of the second lens group.

12. The imaging lens according to claim 1,
wherein the following conditional expression (7) is satisfied, $$0.2 < Bf/f < 0.6 \quad (7),$$

where Bf is an air conversion length from an image side surface of the lens, which is closest to the image side, to the image plane, and f is the focal length of the whole system in the state where the infinite distance object is in focus.

13. The imaging lens according to claim 1,
wherein the following conditional expression (1-1) is satisfied $$1.05 < R1Yr/R1Zf < 1.7 \quad (1-1).$$

14. The imaging lens according to claim 1,
wherein the following conditional expression (2-1) is satisfied, $$|f/f3| < 0.35 \quad (2-1),$$

where f is the focal length of the whole system in the state where the infinite distance object is in focus, and f3 is the focal length of the third lens group.

15. The imaging lens according to claim 1,
wherein the following conditional expression (3-1) is satisfied, $$28 < \nu1Y - \nu1Z < 42 \quad (3-1),$$

where ν1Y is the Abbe number of the second lens from the image side in the first lens group on the basis of the d-line, and ν1Z is the Abbe number of the lens closest to the image side in the first lens group on the basis of the d-line.

16. The imaging lens according to claim 1,
wherein the following conditional expression (4-1) is satisfied, $$0.5 < f/f2 < 1.2 \quad (4-1),$$

where f is the focal length of the whole system in the state where the infinite distance object is in focus, and f2 is the focal length of the second lens group.

17. The imaging lens according to claim 1,
wherein the following conditional expression (5-1) is satisfied, $$0.3 < f/f1 < 0.7 \quad (5-1),$$

where f is the focal length of the whole system in the state where the infinite distance object is in focus, and f1 is the focal length of the first lens group.

18. The imaging lens according to claim 1,
wherein the following conditional expression (6-1) is satisfied, $$-0.4 < R21f/f2 < -0.15 \quad (6-1),$$

where R21f is the radius of curvature of the object side surface of the lens closest to the object side in the second lens group, and f2 is the focal length of the second lens group.

19. The imaging lens according to claim 1,
wherein the following conditional expression (7-1) is satisfied, $$0.3 < Bf/f < 0.6 \quad (7-1),$$

where Bf is the air conversion length from the image side surface of the lens, which is closest to the image side, to the image plane, and f is the focal length of the whole system in the state where the infinite distance object is in focus.

20. An imaging apparatus comprising the imaging lens according to claim 1.

* * * * *